United States Patent [19]

Keys

[11] Patent Number: 4,902,480
[45] Date of Patent: Feb. 20, 1990

[54] LENGTH CONTROL SEAL MEMBER

[75] Inventor: James F. Keys, West Bloomfield, Mich.

[73] Assignee: The Standard Products Company, Cleveland, Ohio

[21] Appl. No.: 301,181

[22] Filed: Jan. 24, 1989

[51] Int. Cl.⁴ .............................................. C09U 7/02
[52] U.S. Cl. .................... 428/295; 428/294; 428/343; 428/354; 428/355; 428/356; 428/492; 428/902; 156/179; 156/308.2
[58] Field of Search ............... 428/294, 343, 354, 355, 428/356, 408, 902, 492, 295; 156/308.2, 179

[56] References Cited

U.S. PATENT DOCUMENTS

| | | |
|---|---|---|
| 1,699,490 | 1/1929 | McManus . |
| 1,742,777 | 1/1930 | Midgley . |
| 1,808,582 | 6/1931 | Taylor . |
| 1,912,255 | 5/1933 | Clark . |
| 2,215,515 | 9/1940 | Matheny ................................. 20/69 |
| 2,337,303 | 12/1943 | Spraragen ............................... 20/69 |
| 2,400,470 | 5/1946 | Spraragen ............................... 20/69 |
| 2,523,022 | 9/1950 | Horstman ............................. 154/2.6 |
| 2,739,358 | 3/1956 | Kunkel ..................................... 20/69 |
| 2,919,478 | 1/1960 | Sehn et al. ............................. 20/69 |
| 3,037,895 | 6/1962 | Quinn .................................... 154/44 |
| 3,380,867 | 4/1968 | Morey .................................... 156/179 |
| 3,475,264 | 10/1969 | Donaldson ......................... 161/143 |
| 3,589,931 | 6/1971 | Marzocchi et al. .................. 117/72 |
| 3,826,074 | 7/1974 | Uffner .................................... 57/140 |
| 4,046,940 | 9/1977 | Prikkel, III ......................... 428/313 |
| 4,564,540 | 1/1986 | Davies ................................. 428/294 |

Primary Examiner—James J. Bell
Attorney, Agent, or Firm—Harness, Dickey & Pierce

[57] ABSTRACT

A seal member has a sealing portion, length control members and a heat activated member securing the length control members to the sealing portion. The length control members prevent excessive elongation of the sealing members during installation when the sealing member is applied by automated equipment.

19 Claims, 1 Drawing Sheet

LENGTH CONTROL SEAL MEMBER

BACKGROUND AND SUMMARY OF THE INVENTION

The present invention relates to sealing and seal members. More particularly, the present invention relates to seal members having members which control the longitudinal elongation of the seal member.

In the automotive, as well as other industries, it is desirous to have seal members that adhesively affix to objects which are to be sealed. Especially in the automotive industry, it is desirous to directly affix seal members to sheet metal work such as doors or the like. To reduce labor costs and increase uniformity, adhesive seals are positioned onto the sheet metal work by robots or the like. The robots, while applying the seal members, have a tendency to stretch and elongate the seal members as they are positioned onto the sheet metal work. Often times, the seals are stretched beyond their desired elongation. Thus, it is desirous to have members, such as a fiberglass, nylon, polyester, Kevlar or the like strands longitudinally positioned in the seal to prevent excessive elongation of the seal members.

Relevant art provides seal members with strands embedded into the seal during manufacturing. The embedding of strands into the rubber seal members requires special machinery to inlay the strands within the seal members during extrusion. While the process works satisfactorily, the tooling is relatively expensive. Also, it is difficult to control the positioning of the strands within the seal member.

Accordingly, it is an object of the present invention to provide the art with seal members which have controlled longitudinal elongation characteristics. Another object of the present invention is to provide the art with a simple and relatively inexpensive method to produce length control seal members. The present invention also provides the art with a seal member that may be easily adhesively affixed to an object such as a vehicle door or the like.

In accordance with the present invention, the sealing member includes a portion for sealing the object such as a vehicle door, window, body or the like. The sealing member is elongated and defines a longitudinal axis. The sealing member is formed from an elastomeric material and includes a surface to couple the sealing member along the longitudinal axis. One or more length control members are positioned on the coupling surface along the longitudinal axis. A heat activated member is positioned on the surface such that the length control members sandwich between the heat activated member and the coupling surface. The heat activated member is heated to bond to the coupling surface such that the heat activated member fixedly secures to the coupling surface forming a laminate sealing member.

From the following detailed description of the preferred embodiments, taken in conjunction with the attached drawings and the appended claims, other objects and advantages of the present invention will become apparent to those skilled in the art.

BRIEF DESCRIPTION OF THE DRAWINGS

FIG. 1 is a perspective view illustrating a sealing member in accordance with the present invention affixed to an object such as a vehicle door or the like.

DESCRIPTION OF THE INVENTION

Figure 1:
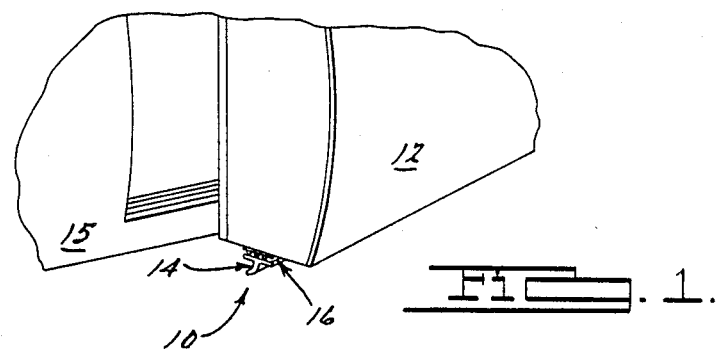

Turning to the figures, a seal member 10 is illustrated on an object such as vehicle door 12 or the like. The seal member 10 generally includes a sealing portion 14 and a mounting portion 16.

The sealing portion 14 may be of any desired configuration. The sealing portion 14 is elongated and formed from a polymeric material such as EPDM sponge or dense rubber. Preferably, the sealing portion 14 has an overall "T" shape in cross-section. The vertical leg or lip 18 of the "T" is angled or arcuate with respect to the horizontal portion 20 to affectuate a seal between the door 14 and car body 15. The horizontal portion 20 of the "T" includes a top flat planar surface 22 and defines a longitudinal axis 23 of the sealing portion 14.

One or more length control members 24 are positioned on top of the planar surface 22. The control members 24 are fiberglass, nylon, polyester, Kevlar, rayon, graphite, cotton, metal wire or the like strands which do not substantially elongate along their longitudinal axis. Also, a thin film of mylar, polyester or the like which exhibits minimal elongation characteristics may be used. Woven fabric, such as yarn, which exhibits minimal elongation characteristics likewise may be used. Woven fabric would also provide lateral as well as longitudinal strength. A desired number of control members 24 are positioned at desired spacings on the planar surface 22 of the sealing portion 14.

A heat activated member 26, such as heat bonded tape, is positioned on top of the control members 24 sandwiching the control members 24 between the heat activated member 26 and the top planar surface 22. The heat activated member 26 is heated to bond to the top planar surface 22 to securely affix the heat activated member 26 to the sealing portion 14. The heat activated member 26 also includes a releasable layer 28 and an adhesive 30 maintaining the releasable layer 28 onto the heat activated layer 32. The releasable layer 28 may be a paper layer or the like which may be removed from the adhesive to allow the adhesive 30 to contact the door 12 to affix the seal 10 onto the door 12, as seen in FIG. 1.

Figure 2:
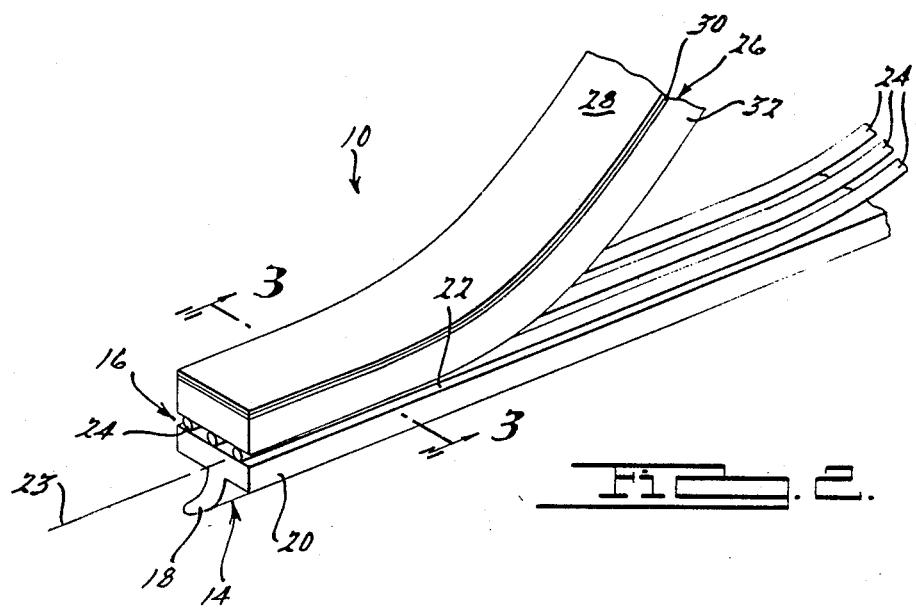
FIG. 2 is a perspective view of forming a sealing member in accordance with the present invention.
Figure 3:
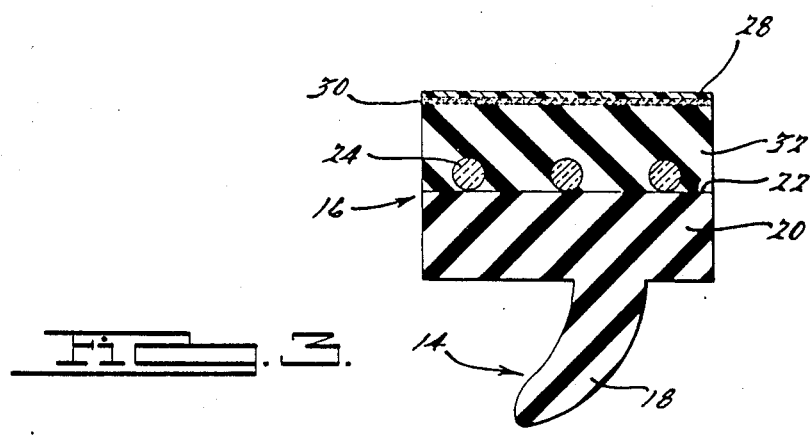
FIG. 3 is a cross-sectional view through a vertical plane taken along line 3—3 in FIG. 2.

Turning to FIG. 2, the sealing portion 14 is extruded or the like from a conventional extrusion die. As the sealing portion 14 is extruded, the length control members 24 are positioned on top of the planar surface 22. The heat activated member 26 is positioned on top of the planar surface 22 to sandwich the length control members 24 between the heat activated layer 32 and sealing portion 14. The heat activated member 26 is heated such that the heat activated layer 32 bonds to the planar surface 22. The bonding securely affixes the heat activated member 26 to the sealing portion 14. The releasable layer 28 may then be removed and the adhesive portion 30 applied to an object such as door 12 to which the sealing member 10 is to be secured.

In another embodiment, the control members may be embedded in the heat activated material. The heat activated material would be placed on the planar surface and heated to secure thereto. Also, adhesive strip materials that permanently or nonremovably bond to the planar surface may be substituted for the heat activated material. In these cases, the length control member may be embedded in the adhesive strip material or placed on the planar surface and secured thereto.

The control length members 24 prevent the sealing member 10 from exceeding a desired elongation. When the sealing member 10 is positioned onto an object, such as door 12, by a robot or the like where there is a tendency for the robot to over stretch or over elongate the sealing member 10. By providing the control length members 24, the sealing member 10 is not over elongated by a robot when it is positioned onto the object.

While the above detailed description sets forth preferred embodiments of the present invention, it will be apparent to those skilled in the art that the present invention is subject to modification, variation and alteration without deviating from the scope and spirit of the following claims.

What is claimed is:

1. A sealing weather strip comprising:
   a means for sealing a door, window, body or the like, said sealing means being elongated, defining a longitudinal axis and formed from an elastomeric material, said sealing means including a surface for coupling said sealing means along said longitudinal axis;
   one or more length control members positioned on said coupling surface along said longitudinal axis; and
   heat activated means for coupling to said coupling surface, said heat activated means covering said longitudinal length control members and being heated to bond to said surface such that said heat activated means fixedly secures to said surface to form a laminate weather strip.

2. The weather strip according to claim 1 wherein said one or more length control members are fiberglass strands.

3. The weather strip according to claim 1 wherein said one or more length control members are nylon strands.

4. The weather strip according to claim wherein said one or more length control members are polyester strands.

5. The weather strip according to claim 1 wherein said one or more length control members are Kevlar strands.

6. The weather strip according to claim 1 wherein said one or more length control members are graphite strands.

7. The weather strip according to claim 1 wherein said one or more length control members are metallic strands.

8. The weather strip according to claim 1 wherein said one or more length control members are rayon strands.

9. The weather strip according to claim 1 wherein said one or more length control members are cotton strands.

10. The weather strip according to claim 1 wherein said heat activated means is comprised of heat bonding tape, one side of said tape enabling heat bonding to said surface, the other to be adhesively secured to an object.

11. A method of forming a weather strip comprising the steps of:
    providing an elongated extruded elastomeric sealing member, said member defining a longitudinal axis and having a surface for coupling said sealing member, one or more length control elements and a heat activated member;
    positioning said one or more length control members longitudinally along said axis on said coupling surface;
    positioning said heat activated member on said coupling surface such that said one or more length control elements are sandwiched between said heat activated member and said coupling surface;
    heating said heat activated member to affix said heat activated member and said one or more length control members to said coupling surface; and
    forming a laminate weather strip with controlled elongation characteristics.

12. The method according to claim 11 further comprising providing one or more fiberglass members as said length control members.

13. The method according to claim 11 further comprising providing one or more nylon members as said length control members.

14. The method according to claim 11 further comprising providing one or more polyester members as said length control members.

15. The method according to claim 11 further comprising providing one or more Kevlar members as said length control members.

16. The method according to claim 11 further comprising providing one or more graphite members as said length control members.

17. The method according to claim 11 further comprising providing one or more metallic members as said length control members.

18. The method according to claim 11 further comprising providing one or more rayon members as said length control members.

19. The method according to claim 11 further comprising providing one or more cotton members as said length control members.

* * * * *

UNITED STATES PATENT AND TRADEMARK OFFICE
CERTIFICATE OF CORRECTION

PATENT NO. : 4,902,480

DATED : February 20, 1990

INVENTOR(S) : James F. Keys

It is certified that error appears in the above-identified patent and that said Letters Patent is hereby corrected as shown below:

Column 3, line 42, after "claim" insert --1--.

Signed and Sealed this

Second Day of June, 1992

Attest:

DOUGLAS B. COMER

*Attesting Officer*    *Acting Commissioner of Patents and Trademarks*